United States Patent
Gray et al.

(10) Patent No.: US 8,203,287 B2
(45) Date of Patent: Jun. 19, 2012

(54) PULSE WIDTH MODULATION CONTROL DEVICE

(75) Inventors: Richard Landry Gray, Saratoga, CA (US); Po Ming Tsai, Taipei (TW)

(73) Assignee: Richard Landry Gray, Saratoga, CA (US)

( * ) Notice: Subject to any disclaimer, the term of this patent is extended or adjusted under 35 U.S.C. 154(b) by 309 days.

(21) Appl. No.: 12/699,879

(22) Filed: Feb. 4, 2010

(65) Prior Publication Data

US 2010/0213865 A1   Aug. 26, 2010

Related U.S. Application Data

(60) Provisional application No. 61/208,441, filed on Feb. 24, 2009.

(51) Int. Cl.
   *H05B 37/02* (2006.01)
(52) U.S. Cl. .................... 315/308; 315/247; 315/287
(58) Field of Classification Search .................. 315/199, 315/246, 247, 272, 287, 291, 299, 302, 307, 315/308; 363/84; 323/282, 283
   See application file for complete search history.

(56) References Cited

U.S. PATENT DOCUMENTS

| | | | | |
|---|---|---|---|---|
| 6,002,214 A | * | 12/1999 | Ribarich | 315/307 |
| 6,909,503 B2 | * | 6/2005 | Baske et al. | 356/246 |
| 7,355,354 B2 | * | 4/2008 | Rust et al. | 315/291 |
| 2003/0222629 A1 | * | 12/2003 | Inoue et al. | 323/224 |
| 2005/0258811 A1 | * | 11/2005 | Matsuo et al. | 323/282 |
| 2006/0214603 A1 | * | 9/2006 | Oh et al. | 315/246 |
| 2008/0297065 A1 | * | 12/2008 | Mubaslat et al. | 315/291 |

* cited by examiner

*Primary Examiner* — Tung X Le

(57) ABSTRACT

The present invention relates to a pulse-width modulation (PWM) control device, especially to a PWM control device for use with a TRIode for an Alternating Current (TRIAC) dimmer. The PWM control device is comprised of a load, a rectifier, a PWM control module and a PWM controllable ballast. The load may be a gas discharge lamp, a motor, a heating device or a light emitting diode lamp. The rectifier is connected to a power module and rectifies a truncated sinusoidal voltage from the power module to a pulsating truncated direct current (DC) voltage. The PWM control module is connected to the power module and the rectifier and generates a PWM control signal. The PWM controllable ballast is driven by a boost circuit and is controlled by the PWM control signal that limits current to a proper value for the load.

8 Claims, 5 Drawing Sheets

Replacement Sheet

US 8,203,287 B2

PULSE WIDTH MODULATION CONTROL DEVICE

FIELD OF THE INVENTION

The present invention relates to a pulse-width modulation (PWM) control device, especially to a PWM control device for use with a TRIode for an Alternating Current (TRIAC) dimmer.

BACKGROUND OF THE INVENTION

Light dimming is performed by adjusting voltage through a lamp and has been possible for many decades by using adjustable power resistors and adjustable transformers. The problems of such light controlling methods have been that they are big, expensive, inefficient and are difficult to control from a remote location.

Recent conventional dimmers generally work by varying the "duty cycle" of an AC voltage that is applied to the lights being controlled. Between 1960 and 1970, a TRIode for Alternating Current (TRIAC) became available in the market. Using a TRIAC component allowed dimmers to be made small and inexpensive. Currently dimmers with a TRIAC component are used in many locations such as homes, restaurants, conference rooms and stage lighting.

The TRIAC component, when triggered by a sufficient voltage, will conduct current as long as current through it is not zero. In an AC circuit the TRIAC is usually triggered twice for every AC voltage cycle. Thus, the TRIAC component is useful as a switching element for all types of AC electronic applications. The TRIAC component triggers at a position along the AC sinusoidal voltage which chops the AC voltage between the zero voltage and the trigger position. For example, if the AC voltage applied to a light bulb, is chopped for half of each AC voltage cycle, the light bulb will appear to be much less bright than when the full AC voltage cycle is applied. Moreover, the conventional dimmer uses a brightness knob to set the trigger position in each AC voltage cycle to switch the light on.

The foregoing dimmer with the TRIAC component works well for incandescent lights but is not suited for lights that require ballasts. Using the conventional TRIAC dimmer on a gas discharge lamp, cold cathode fluorescent lamp (CCFL), carbon nanotube lamp (CNL) or white LED (WLED) lamp without a specially designed electronic ballast may result in improper lamp operation or damage of the lamp.

Another dimming method used in a gas discharge lamp is a pulse width modulation (PWM) dimmer. The PWM dimmer of the gas discharge lamp turns the lamp on and off at a fixed frequency but at a varying duty cycle. The fixed frequency is chosen higher than a human eye can detect. The duty cycle determines the brightness of the lamp. The PWM dimmer produces efficient operation at any level of brightness.

However, integrating a TRIAC dimmer with the PWM dimmer is complicated since a truncated voltage produced by a TRIAC is abbreviated not only in time but also in voltage. Some conventional ballasts work well with constant AC voltage. The voltage required for a ballast to operate properly may be high when compared to the voltage of the truncated voltage available from the TRIAC and as such may not be able to turn on the ballast.

Moreover, if a conventional passive fluorescent ballast receives the truncated voltage instead of a smooth AC voltage, a transient voltage of the truncated voltage might feed into some magnetic element and cause immediate lamp failure.

Most ballasts first rectify the incoming AC voltage to provide a quasi DC voltage that drives the lamp. Some lamp designers use a capacitor to store power to keep the ballast "alive" during the OFF period of the TRIAC. However in this case, the dimming information in the truncated voltage from the TRIAC would no longer be available because it has been filtered out, preventing it from being utilized for PWM dimming. Furthermore, the capacitor needed for storing the power may be expensive and large.

Therefore, lighting manufacturers are eager to develop a pulse-width modulation control device with a TRIAC dimmer that reliably dims all ballasted lighting using TRIAC dimmers with efficient PWM dimming features.

SUMMARY OF THE INVENTION

The first objective of the present invention is to provide a pulse-width modulation (PWM) control device for use with a TRIode for an Alternating Current (TRIAC) dimmer that reliably dims all ballasted lighting using a TRIAC dimmer with efficient PWM dimming features.

The present invention relates to a pulse-width modulation (PWM) control device, especially to a PWM control device for use with a TRIode for an Alternating Current (TRIAC) dimmer. The PWM control device comprises a load, a rectifier, a PWM control module and a PWM controllable ballast. The load may be a gas discharge lamp, a motor, a heating device or a light emitting diode lamp. The rectifier is connected to a power module and rectifies a truncated sinusoidal voltage from the power module to a pulsating truncated direct current (DC) voltage. The PWM control module is connected to the power module and the rectifier and generates a PWM control signal. The PWM controllable ballast is driven by the pulsating truncated DC voltage, is controlled by the PWM control signal and is used for limiting current to a proper value for the load.

BRIEF DESCRIPTIONS OF THE DRAWINGS

DETAILED DESCRIPTION OF THE PRESENT INVENTION

Figure 1:
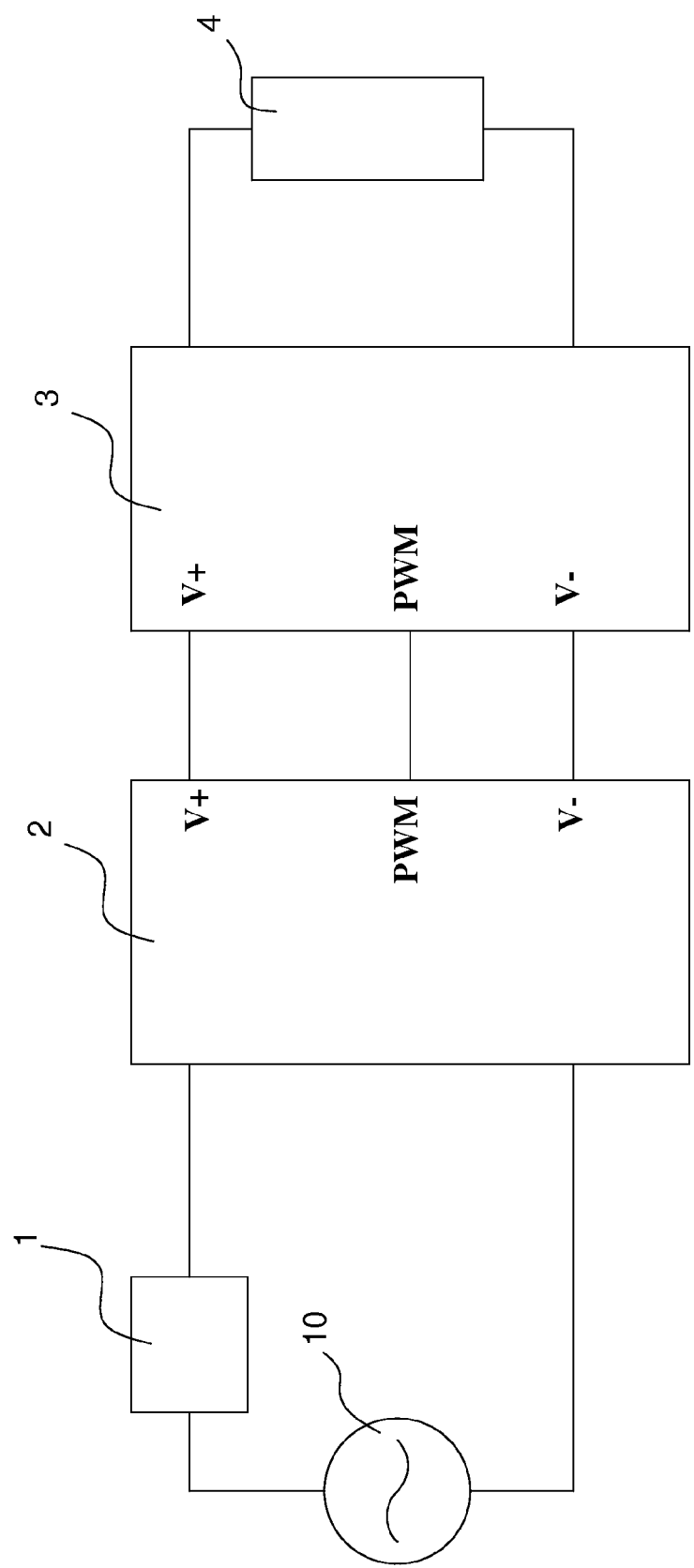
FIG. 1 is a functional block diagram of a pulse-width modulation (PWM) control device with a TRIode for an Alternating Current (TRIAC) dimmer in accordance with present invention.
Figure 2:
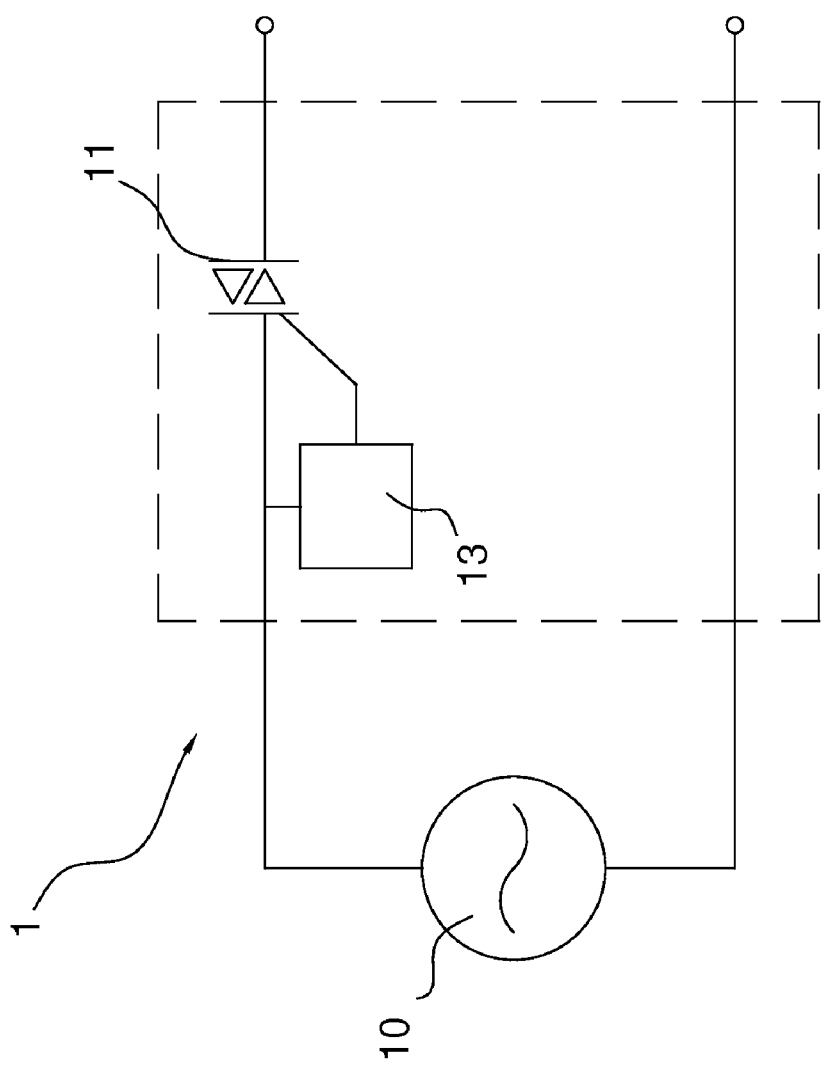
FIG. 2 is a circuit diagram of a power module in FIG. 1.
Figure 3:
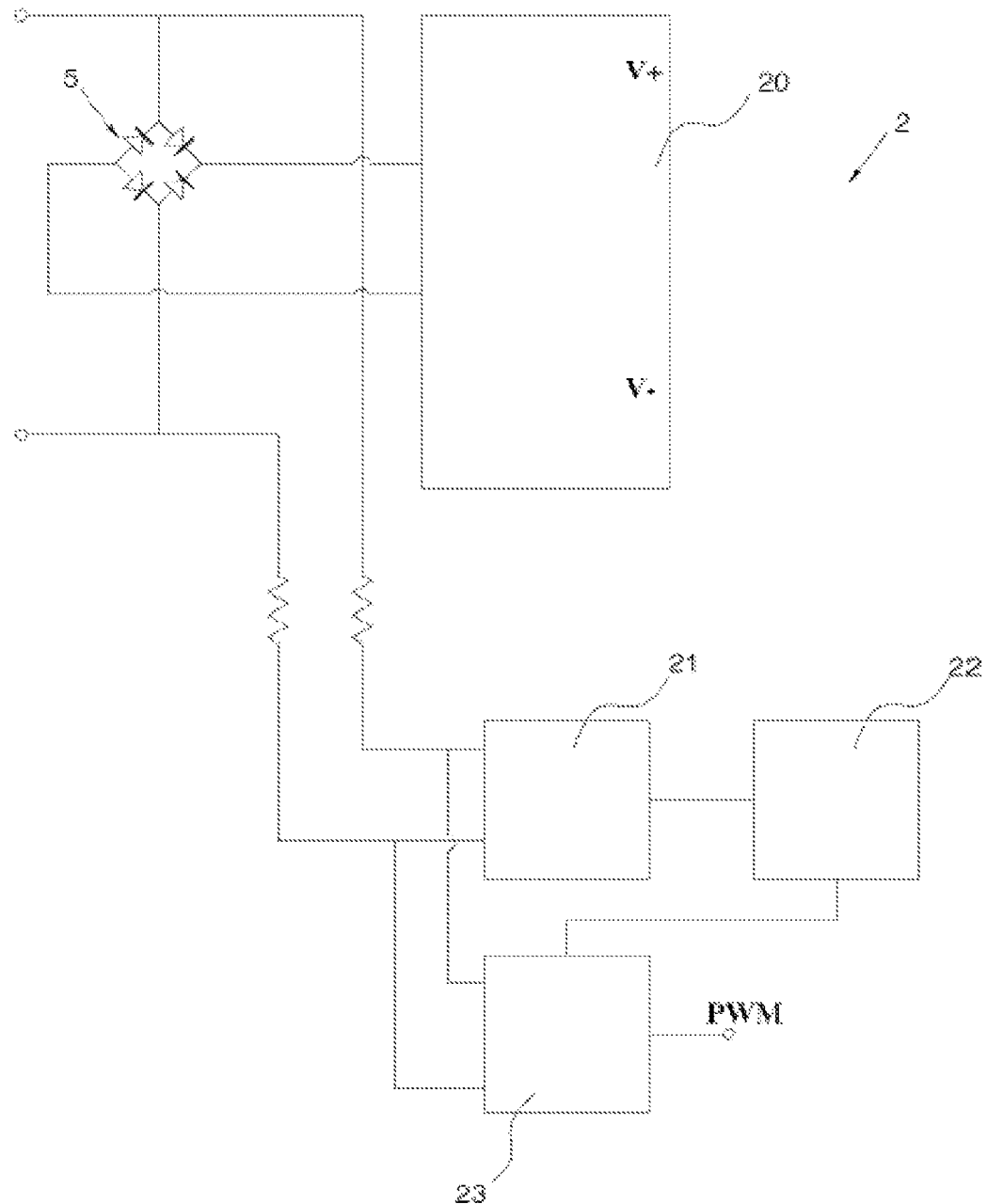
FIG. 3 is a circuit diagram of a PWM control module in FIG. 1.
Figure 4:
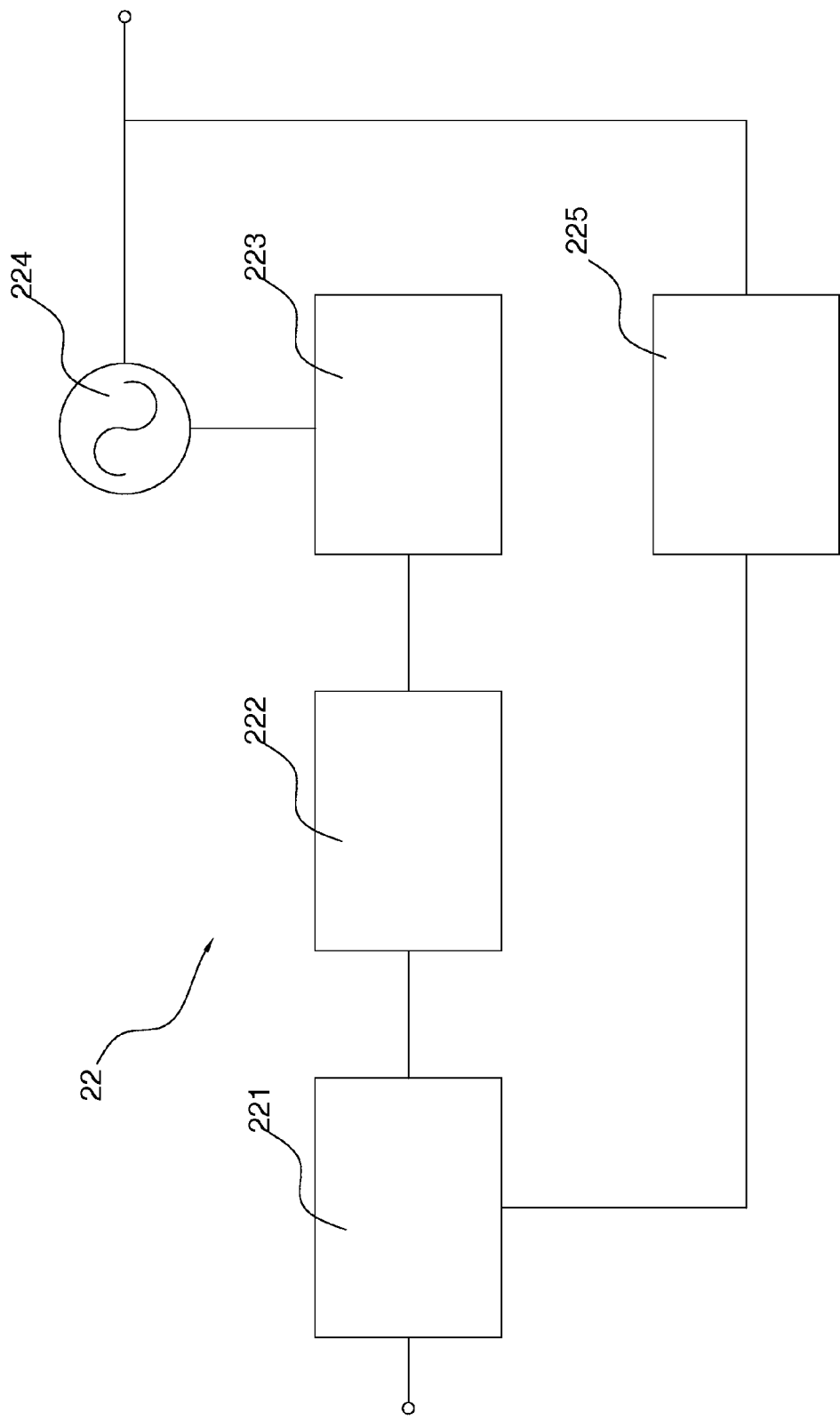
FIG. 4 is a circuit diagram of a phase-locked loop circuit in FIG. 3.
Figure 5:
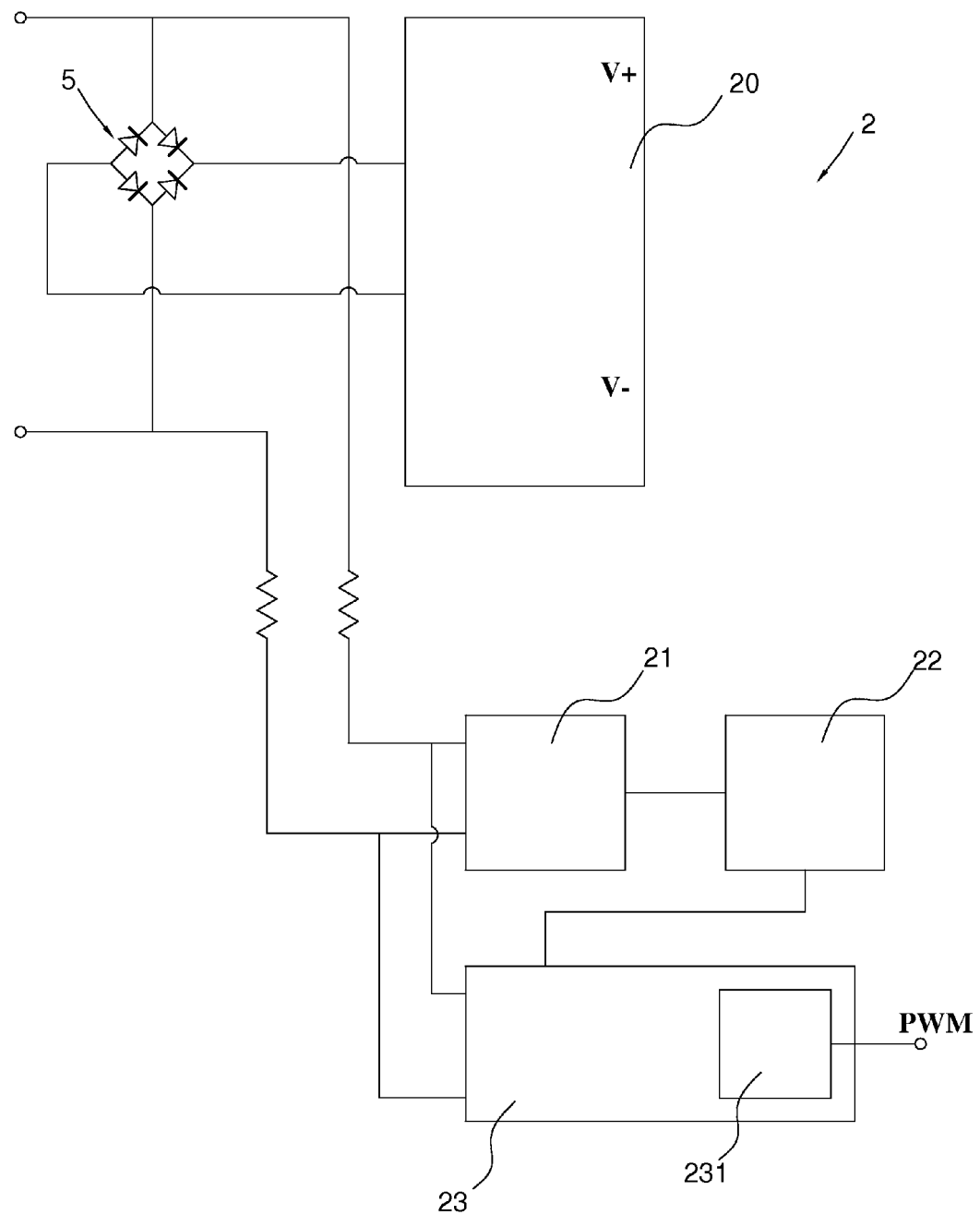
FIG. 5 is a circuit diagram of the duty cycle detector further comprising a duty-factor mapping unit in FIG. 3.

With reference to FIGS. 1 to 3, a pulse-width modulation (PWM) control device with a TRIode for an Alternating Current (TRIAC) dimmer in accordance with the present invention comprises a load (4), a rectifier (5), a PWM control module (2) and a PWM controllable ballast (3).

The load (4) may be a gas discharge lamp, a motor, a heating device, a light emitting diode (LED) lamp or a white LED (WLED) lamp. The gas discharge lamp is selected from a group consisting of a cold cathode fluorescent lamp (CCFL), a hot cathode fluorescent lamp (HCFL), a compact fluorescent lamp (CFL), an external electrode fluorescent lamp (EEFL), a carbon nanotube lamp (CNL) and a high intensity discharge lamp (HID).

With further reference to FIGS. 2 and 3, the rectifier (5) is connected to a power module (1) and rectifies a truncated sinusoidal voltage from the power module (1) to a pulsating truncated direct current (DC) voltage.

The power module (1) is connected to an AC power source (10), receives a sinusoidal voltage from the AC power source (10) and generates the truncated sinusoidal voltage corresponding to the sinusoidal voltage. The power module (1) comprises a TRIAC component (11) and an optional knob (13).

The TRIAC component (11) generates the truncated sinusoidal voltage by removing a segment of the sinusoidal voltage after a zero crossing. Applying a trigger pulse at a controllable point in a cycle of the sinusoidal voltage allows current to flow through the TRIAC component (11) to the load (4).

The knob (13) is connected to the TRIAC component (11) and can be rotated to adjust the control point in the cycle of the sinusoidal voltage at which the TRIAC component (11) starts to conduct.

The PWM control module (2) is connected to the rectifier (5) and the power module (1), generates a PWM control signal and comprises a boost circuit (20), a comparator (21), a phase-locked loop (PLL) circuit (22), a duty cycle detector (23).

The boost circuit (20) is connected to the rectifier (5), receives and boosts the pulsating truncated DC voltage to a high DC voltage (on the order of 400 volts). (Circuits other than classical "boost" topologies can also provide this function, and the invention does not require the boost circuit (20) to be a classical boost design.). In this way, a large amount of energy can be stored on a small capacitor, negating the need for large impractical capacitors. The boost circuit (20) may also provide some power factor correction function.

The comparator (21) is connected to the power module (1). The comparator (21) receives and senses zero crossings of the truncated sinusoidal voltage in order to indicate both the duty cycle and frequency of the truncated sinusoidal voltage.

With reference to FIGS. 1 to 4, the PLL circuit (22) is connected to the comparator (21) and receives a signal that is indicative of the frequency and phase of the truncated sinusoidal voltage. The PLL circuit (22) provides a control signal with fixed frequency that is phase synchronized with the phase of the truncated sinusoidal voltage. The PLL circuit (22) comprises a phase-frequency detector (PFD) (221), a charge pump (222), a loop filter (223), a voltage controlled oscillator (VCO) (224) and a frequency divider (225).

The PFD (221) detects a phase differential between the truncated sinusoidal voltage and a feedback signal.

The charge pump (222) is connected to the PFD (221) and produces a control signal based on the phase error (differential of the truncated sinusoidal voltage and the feedback signal) from the PFD (221).

The loop filter (223) is connected to the charge pump (222). It may be a low-pass filter which filters out high frequency components of the control signal.

The VCO (224) generates a signal with a frequency that forms a basis for the control signal.

The frequency divider (225) is driven by the signal at the output of the VCO (224) and divides the signal at the output of the VCO (224) into smaller frequencies and feeds the divided signal as the feedback signal back to the PFD (221).

For instance, by using the proper frequency divider (225) the VCO (224) may quadruple the frequency of the truncated sinusoidal voltage to 240 Hz (such that the frequency of the control signal is four times higher than the sinusoidal voltage of the general AC power (60 Hz)). The higher frequency provides more stable and flicker-free signal output and is especially desirable for dimmers used with 50 Hz line voltages. Generally, a TRIAC dimmer used in a 50 Hz environment will interrupt current flow at a 100 Hz rate (not 120 Hz as in 60 Hz environments). A 100 Hz dimming frequency is slow enough that flicker caused by it may be perceptible to humans. As such, 100 Hz is a poor choice to use for PWM dimming frequency.

With reference to FIGS. 1 to 3 and 5, the duty cycle detector (23) is connected to the power module (1) and the PLL circuit (22) and further comprise an optional duty-factor mapping unit (231). The duty cycle detector (23) determines the duty factor of the truncated sinusoidal voltage emanating from the power module (1) and generates a PWM control signal that converts the control signal from the PLL circuit (22) to the same duty factor as that of the truncated sinusoidal voltage.

The duty-factor mapping unit (231) provides a non-linear mapping function that converts the PWM control signal to a desired duty cycle. The converted PWM control signal is a different duty factor from the PWM control signal of the duty cycle detector (23).

There is no limitation on what the particular mapping function must be. For instance, common mapping functions would change the control range of the knob (13) so that a lamp using the duty factor mapping unit (231) did not turn on at all until the truncated sinusoidal voltage reached a point of some minimum duty cycle. After that point continued turns of the knob would produce a linear increase in brightness. The benefits of this type of mapping function are that there would be no low intensity flickering and the power factor of the device would improve. This is because the lamp would not operate when the truncated sinusoidal voltage was very small where subsequent input currents would be large and full of harmonic content.

The PWM controllable ballast (3) is driven by the boost circuit (20), is controlled by a PWM control signal and is used for limiting current to a proper value for the load (4). The PWM controllable ballast (3) may be either directly connected to the duty cycle detector (23) or desirably connected to the duty-factor mapping unit (231).

Persons skilled in the art will understand that various changes, modifications and alterations in form and details may be made without departing from the spirit and scope of the invention.

What is claimed is:

1. A pulse-width modulation (PWM) control device comprising
    a load;
    a rectifier being connected to a power module and rectifying a truncated sinusoidal voltage from the power module to a pulsating truncated direct current (DC) voltage;
    a PWM control module being connected to the power module, generating a PWM control signal and comprising
        a boost circuit being connected to the rectifier, receiving and boosting the pulsating truncated DC voltage to high DC voltage;
        a comparator being connected to the power module, sensing zero crossings of the truncated sinusoidal voltage in order to indicate both the duty cycle and frequency of the truncated sinusoidal voltage;
        a phase-locked loop (PLL) circuit is connected to the comparator, receiving a signal that is indicative of the frequency and phase of the truncated sinusoidal voltage, generating a control signal with fixed frequency and a phase synchronized to the phase of the truncated sinusoidal voltage;

a duty cycle detector being connected to the power module and the PLL circuit, determining a duty factor of the truncated sinusoidal voltage emanating from the power module and generating a PWM control signal that converts the control signal from the PLL circuit to the same duty factor as that of the truncated sinusoidal voltage; and a PWM controllable ballast being driven by the boost circuit, being controlled by the PWM control signal and being used for limiting current to a proper value for the load.

2. The PWM control device as claimed in claim 1, wherein the duty cycle detector further comprises a duty-factor mapping unit that provides a non-linear mapping function to convert the PWM control signal to a desired duty cycle.

3. The PWM control device as claimed in claim 1, wherein the power module is connected to an AC power source, receives a sinusoidal voltage from the AC power source and generates the truncated sinusoidal voltage corresponding to the sinusoidal voltage and comprises a TRIode for an Alternating Current (TRIAC) component, the TRIAC generates the truncated sinusoidal voltage by removing a segment of the sinusoidal voltage after a zero crossing, applies a trigger pulse at a controllable point in a cycle of the sinusoidal voltage that allows current to flow through the TRIAC component to the load.

4. The PWM control device as claimed in claim 3, wherein the power module further comprises a knob, the knob is connected to the TRIAC component and can be rotated to adjust the control point in the cycle of the sinusoidal voltage at which the TRIAC component starts to conduct.

5. The PWM control device as claimed in claim 1, wherein the PLL circuit comprises a phase-frequency detector (PFD) detects a phase differential of the truncated sinusoidal voltage and a feedback signal;

a charge pump is connected to the PFD and produces a control signal based on the phase difference between the truncated sinusoidal voltage and the feedback signal from the PFD;

a loop filter is connected to the charge pump and filters out high frequency components of the control signal;

a voltage controlled oscillator (VCO) generates a signal with a frequency that forms a basis for the control signal; and a frequency divider is driven by the signal at the output of the VCO and divides the signal at the output of the VCO into smaller frequencies and feeds the divided signal as the feedback signal back to the PFD.

6. The PWM control device as claimed in claim 5, wherein the loop filter is a low-pass filter.

7. The PWM control device as claimed in claim 1, wherein the load is a gas discharge lamp, a motor, a heating device, a light emitting diode (LED) lamp or a white LED lamp.

8. The PWM control device as claimed in claim 7, wherein the gas discharge lamp is selected from a group consisting of a cold cathode fluorescent lamp, a hot cathode fluorescent lamp, a compact fluorescent lamp, an external electrode fluorescent lamp, a carbon nanotube lamp and a high intensity discharge lamp.

* * * * *